Jan. 25, 1955  C. H. VIEBROCK ET AL  2,700,310
POWER TRANSMITTING DEVICE
Filed Nov. 13, 1951  2 Sheets-Sheet 1
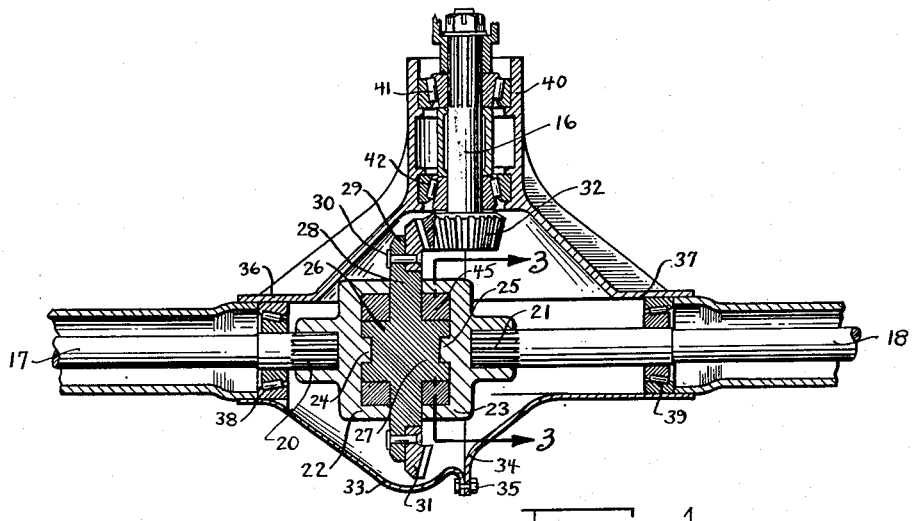
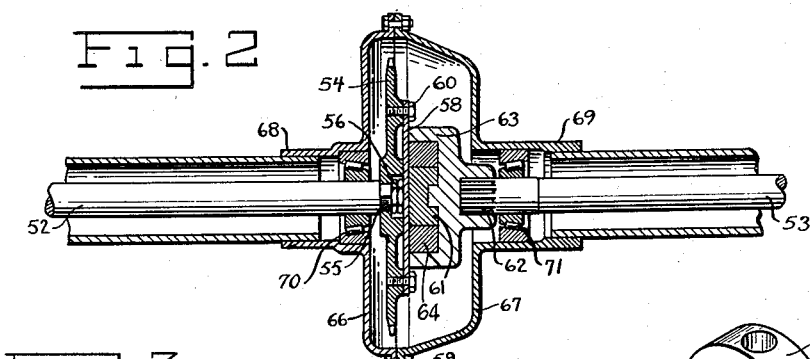
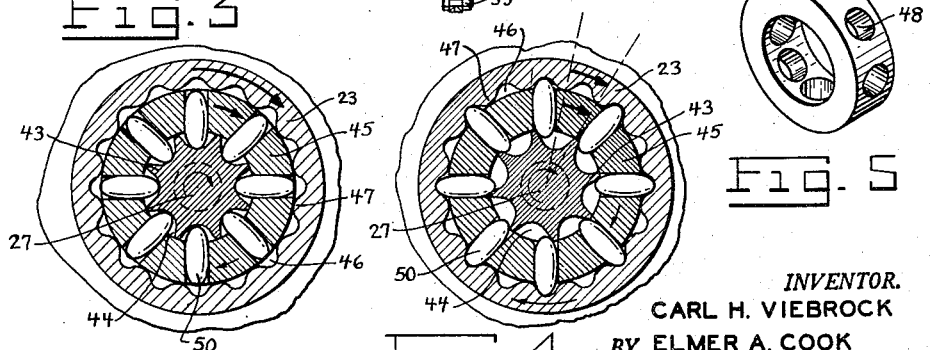
INVENTOR.
CARL H. VIEBROCK
BY ELMER A. COOK
Barnes + Seed
attys Jan. 25, 1955     C. H. VIEBROCK ET AL     2,700,310
POWER TRANSMITTING DEVICE
Filed Nov. 13, 1951     2 Sheets-Sheet 2
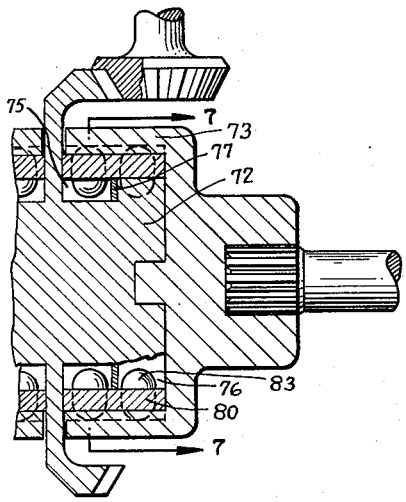
Fig. 6
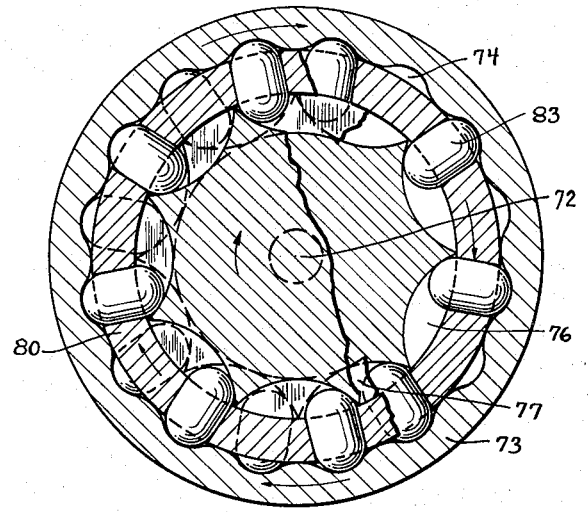
Fig. 7
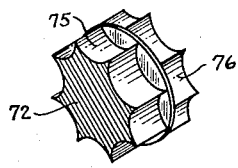
Fig. 8
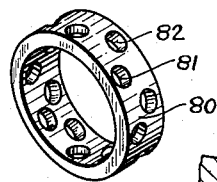
Fig. 9
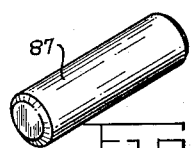
Fig. 11
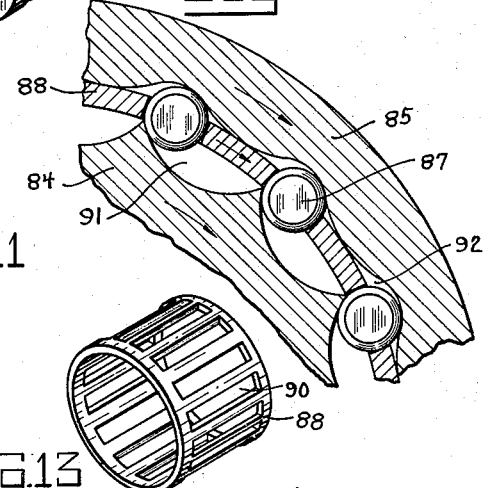
Fig. 10
Fig. 13
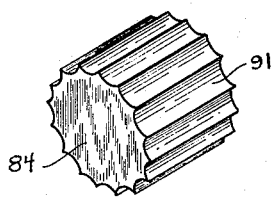
Fig. 12
INVENTOR.
CARL H. VIEBROCK
ELMER A. COOK
BY Barnes + Seed
attys United States Patent Office 2,700,310
Patented Jan. 25, 1955

2,700,310

POWER TRANSMITTING DEVICE

Carl H. Viebrock and Elmer A. Cook, Douglas, Wash.

Application November 13, 1951, Serial No. 256,034

6 Claims. (Cl. 74—650)

The present invention relates to a power transmitting device of the general type in which a driven element is free to overrun its driving element and it is particularly adapted for use on vehicles having a four-wheel drive.

To elaborate, on four-wheel drive vehicles it has been found that some means must be provided for compensating for the fact that the mean speed of one set of wheels is often different from that of the other set of wheels. Accordingly, it is a principal object of the present invention to provide a power transmitting device which can be inserted between aligned drive shaft sections to the front and rear axles and which will permit one of the drive sections to overrun the other.

A further object is to provide a power transmitting arrangement which can be utilized as the front and rear differentials of a four-wheel drive vehicle having a common drive shaft to both differentials and which will permit any or all of the axles to overrun the drive thereto.

With these and other still more particular objects and advantages in view, and which will appear and be understood in the course of the following description and claims, the invention consists in the novel construction and in the adaptation and combination of parts hereinafter described and claimed.

In the accompanying drawings:

Figure 1 is a horizontal sectional view of one embodiment of my invention.

Fig. 2 is a horizontal sectional view of a second embodiment.

Fig. 3 is a vertical sectional view taken along line 3—3 of Fig. 1 and showing the driven element in an overrunning condition.

Fig. 4 is the same section as Fig. 3 with the exception that the parts are illustrated when a driving condition exists, the length of the direction arrows in Figs. 3 and 4 being varied to indicate relative motion between the driven element and the driving head.

Fig. 5 is a perspective view of the cage.

Fig. 6 is a fragmentary horizontal sectional view of a third embodiment of my invention with one of the driving head teeth being broken away.

Fig. 7 is a vertical sectional view taken along line 7—7 of Fig. 6 and with certain of its parts broken away.

Figs. 8 and 9 are perspective views of the driving head and cage, respectively, of the said third embodiment.

Fig. 10 is a fragmentary vertical sectional view of the fourth modification of my invention shown in driving condition.

Figs. 11, 12 and 13 are perspective views of one of the rollers, the driving head, and cage, respectively, of my fourth embodiment.

The embodiment of Fig. 1 shows the present invention applied to a differential used to transmit power from a drive shaft 16 to aligned axles 17, 18. The driven ends of these axles are splined as at 20, 21 and are fitted into the hubs of driven elements 22, 23 which in turn present inwardly directed stubs 24, 25 journaled in a pair of driving heads 26, 27. These heads are integrated with an enlarged hub 28 presenting an annular flange 29, and fixedly secured to this flange by rivets 30 is a bevel gear 31 receiving its drive from a bevel pinion 32 carried by the shaft 16. The unit is encased in a split housing whose halves 33, 34 are held together by bolts 35 and are so shaped as to provide aligned reduced prolongations 36, 37 serving to hold roller bearings 38, 39 for the axles 17, 18. The housing also provides a reduced extension 40 in which are mounted a pair of roller bearings 41, 42 for the drive shaft.

The driving arrangement between the pairs of driving heads 26, 27 and driven elements 22, 23 are identical and hence the explanation to be now given of the drive between the driving head 27 and driven element 23 with reference to Figs. 3 and 4 will apply equally to the other drive. Referring to such figures it can be seen that the driving head 27 is formed with radially extending teeth 43 so shaped as to provide arcuate shaped pockets 44 therebetween extending the length of the head. Riding freely on the tips of these teeth is an annular cage 45. The inner periphery of the driven element 23 is formed with a plurality of circumferentially spaced arcuate pockets 46, there being twice as many of these pockets as pockets 44 provided by the driving head. The outer periphery of the cage 45 is journaled upon the ends of the lands 47 which are intermediate the pockets of the driven element.

As shown in Fig. 5 the cage presents a plurality of radially extending guide holes 48 equal in number to the pockets of the driving head. Into each of these guide holes there is slidably fitted a plunger 50. These plungers are round in cross section and their ends are reduced to provide rounded noses which are adapted to fit with ease into the pockets. It is important to note that the length of these plungers, as shown in Fig. 3, is no greater than the thickness of the cage plus the depth of the driving head pockets, and in this regard the depth of the driving element pockets 46 is somewhat less than that of the driving head pockets 44. The latter is true so that when the outer nose of the plungers are seated in the driven element pockets as shown in Fig. 4 the teeth of the driving head will still be in engagement with the inner noses of the plungers to complete a driving connection between the driving head and the driven element.

The embodiment illustrated in Fig. 2 is intended for use on a vehicle having a four-wheel drive to which axially-aligned drive shafts 52 and 53 extend rearwardly and forwardly to conventional differentials (not shown) which transmit the power to the four wheels. The shaft 52 has a driving connection with the hub of a sprocket 54 driven by a chain from the vehicle's engine. This connection is accomplished by providing the shaft with a squared head portion 55 which fits a mating bore in the sprocket hub. Nuts 56 threaded on the root end of the shaft serve to hold the latter in locked engagement with the sprocket.

An annular plate 58 is fixed by bolts 60 to the sprocket 54 and secured as by welding to this plate is a driving head 61. The inner end of the shaft 53 is splined as at 62 for receiving the hub of a driven element 63. Riding between the driving head and the driven element is a cage 64. The driving arrangement between the driving head 61, cage 64, and driven element 63 is identical with that illustrated in Figs. 3 and 4 for the corresponding members 27, 45, and 23, respectively. A split housing is provided with its halves 66, 67 being held together by bolts 59. These halves present reduced end sections 68, 69 into which are fitted roller bearing units 70, 71 for supporting the respective ends of the shafts 52 and 53.

In the differential arrangement of Fig. 1 the variance in the speeds of the axles 17, 18 will, of course, occur when the vehicle with which it is associated is being turned. Assuming, for purposes of example, that the wheel with which the right-hand axle 18 is associated has the greater turning radius for a particular maneuver, the driven element 23 will begin to overrun the driving head 27 as the turn is commenced. As a result of this overrun the plungers 50 will be forced inwardly by the lands 47 of the driven element until they are fully seated in the pockets 44 of the driving head as shown in Fig. 3. When the plungers are so seated the driven element is free to rotate about the cage 45 and will continue to do so until the turn is completed at which time the driving head will cause the plungers to be urged outwardly again into alternate ones of the driven element pockets 46 so that a driving connection to the driven element is again accomplished as shown in Fig. 4. In this regard, the frictional drag of the driven element 23 on the cage 45 is sufficient to cause the driving head 27 to advance with respect to the cage from the relative positions shown in Fig. 3 when the speed of the driving head begins to exceed that of the driven element. This insures that the plungers 50 will then be forced outwardly by the driving head as aforesaid.

Continuing to an explanation of the embodiment of Fig. 2, when a load is placed on both of the drive shafts 52, 53 the driving head 61, as it turns, will force the plungers outwardly until the outer ends thereof assume the Fig. 4 position. As a result the driven element and driving head will turn in unison. If the front wheels of the vehicle begin to turn faster than the rear wheels so as to urge the shaft 53 to turn at a speed exceeding that of the sprocket 54 and the other shaft 52 the driven element 63 will begin to overrun the driving head and this will cause the plungers to be forced inwardly to the Fig. 3 position. The driven element will then be free to rotate about the cage and will continue to do so until the shaft 53 slows down to a speed less than that of the driving head. When such a speed reduction does occur the plungers will be forced outwardly again so that a driving connection to the driven element will again be effected.

In the modification of Figs. 6–9 the working portions of the driving head and driven element are lengthened, the lengthened head and element being identified by the numerals 72 and 73, respectively. The contour of the pockets 74 of the driven element is not varied, the change being in the length only. The driving head, on the other hand, is provided with two sets of pockets 75 and 76 instead of one. The contour of the pockets of each set is identical, the difference in the two halves of the driving head residing in the fact that the teeth of one half are staggered intermediate those of the other half. A central circumscribing groove is provided around the driving head between the two sets of pockets and into this groove is fitted a snap ring 77 whose outer periphery has a radius corresponding to that transcribed by the outer tips of the driving head teeth. The cage, denoted by 80 and best shown in Fig. 9, is provided with two circumferentially extending columns of holes 81 and 82 which are likewise staggered in accordance with the staggering of the pockets of the driving head. The operation of this modified unit is identical to that afore-described except that twice as many plungers are utilized with the result being that when the driven element is being driven each of its pockets receives a plunger, denoted by 83 in the present instance, instead of only alternate pockets as in the former examples.

A further proposed modification is illustrated in Figs. 10–13. In this case the driving head and driven element, identified as 84 and 85, have the same number of pockets 86 and the driving connection therebetween is accomplished by the use of cylindrical rollers 87 having their axes parallel to the axis of the driving head. The cage 88 for these rollers is relatively thin and is formed with rectangular slots 90 for receiving the rollers. In this case, as before, the depth of the driving head pockets 91 must exceed the pockets 92 of the driven element so that when the rollers are seated on the extreme floor of the driving head pockets they will not extend radially beyond the outer circumference of the cage 88 and obstruct an overrun by the driven element. The relative positions of the parts when a driving state exists is illustrated in Fig. 10 and it is thought that the positions of the parts when an overrun condition exists will be obvious therefrom in view of the preceding description.

The invention should be clear from the foregoing detailed description, but it is to be understood that changes may be made without departing from the inventive concept and I therefore intend that the hereto annexed claims be given a scope fully commensurate with the broadest interpretation which the employed language fairly permits.

We claim:

1. In a power transmitting device, rotary driving and driven elements in concentric spaced relationship to one another, a floating cage between the said elements, the rotary elements each presenting a plurality of circumferentially spaced pockets open to the cage, the pockets in the driving element being deeper than those in the driven element, said cage presenting a plurality of radially extending guide openings, and plunger members slidably carried in the said guide openings and shaped to seat in the pockets of both said rotary elements, each said plunger member having its radially extending dimension exceeding the thickness of the cage by an amount greater than the depth of the pockets in the driven element but no greater than the depth of the pockets in the driving element, said driven element exerting a frictional drag on said floating cage to insure that the driving element will exert radial forces on said plunger members urging the latter toward said driven element whenever the driving and driven elements are turning at different speeds so that the driven element can completely overrun the driving element and yet be driven from the driving element by the plunger members when no such overrun exists.

2. In a power transmitting device, rotary driving and driven elements in concentric spaced relationship to one another, a floating cage between the said elements, the rotary elements each presenting a plurality of circumferentially spaced pockets open to the cage, the pockets in the driving element being deeper than those in the driven element, said cage presenting a plurality of radially extending guide openings, and rollers slidably carried in the said guide openings with their axes extending lengthwise of the rotary elements and each having a diameter exceeding the thickness of the cage by an amount greater than the depth of the pockets in the driven element but no greater than the depth of the pockets in the driving element, said driven element exerting a frictional drag on said floating cage to insure that the driving element will exert radial forces on said plunger members urging the latter toward said driven element whenever the driving and driven elements are turning at different speeds so that the driven element can completely overrun the driving element and yet be driven from the driving element by the rollers when no such overrun exists.

3. In a power transmitting device, rotary driving and driven elements in concentric spaced relationship to one another, a floating cage between the said elements, the rotary elements each presenting a plurality of circumferentially spaced pockets open to the cage, the pockets in the driving element being deeper than those in the driven element, said cage presenting a plurality of radially extending round guide openings, and cylindrical plunger members slidably carried in the guide openings and each having a length exceeding the thickness of the cage by an amount greater than the depth of the pockets in the driven element but no greater than the depth of the pockets in the driving element, said driven element exerting a frictional drag on said floating cage to insure that the driving element will exert radial forces on said plunger members urging the latter toward said driven element whenever the driving and driven elements are turning at different speeds so that the driven element can completely overrun the driving element and yet be driven from the driving element by the plunger members when no such overrun exists.

4. In a power transmitting device, rotary driving and driven elements in concentric spaced relationship to one another, a floating cage between the said elements, the rotary elements each presenting an equal number of pockets open to the cage with the pockets in the innermost of said rotary elements being arranged in two staggered circumferential columns and with the pockets in the outermost element being in one circumferential column and each elongated to overlap both of the aforesaid columns, the pockets in the driving element being deeper than those in the driven element, said cage presenting two staggered circumferential columns of radially extending guide openings arranged in correspondence with the two columns of pockets in the innermost elements, and plunger members slidably carried in the said guide openings and each having its radially extending dimension exceeding the thickness of the cage by an amount greater than the depth of the pockets in the driven element but not greater than the depth of the pockets in the driving element, said driven element exerting a frictional drag on said floating cage to insure that the driving element will exert radial forces on said plunger members urging the latter toward said driven element whenever the driving and driven elements are turning at different speeds so that the driven element can completely overrun the driving element and yet be driven from the driving element by the plunger members when no such overrun exists.

5. In a power transmitting device, a pair of independently turning axially aligned rotary driven elements and rotary driving means providing a pair of driving elements turning in unison and each arranged in concentric spaced relation to a respective one of said driven elements, floating cage means between the said driving and driven elements, each of the said elements presenting a plurality of circumferentially spaced pockets open to the cage means, the pockets in the driving elements being deeper than those in the driven elements, said cage means presenting a plurality of radially extending guide openings, and plunger members slidably carried in the said guide openings and each having its radially extending dimension exceeding the thickness of the cage means by an amount greater than the depth of the pockets in the driven elements but no greater than the depth of the pockets in the driving element, said driven element exerting a frictional drag on said floating cage to insure that the driving element will exert radial forces on said plunger members urging the latter toward said driven element whenever the driving and driven elements are turning at different speeds so that each of the driven elements can completely overrun the driving means and yet each be driven from the driving means by the respective plunger members when no such overrun exists.

6. In a power transmitting device, rotary driving and driven elements in concentric spaced relationship to one another, a floating cage between the said elements, the said rotary elements presenting respective sets of evenly spaced circumferentially arranged pockets open to the cage with the pockets in the driving element being deeper than those in the driven element, said cage presenting a set of evenly spaced guide openings extending between the said sets of pockets, and plunger members slidably carried in the said guide openings and shaped to seat in the pockets of both said rotary elements, the number of pockets in one of the said sets of pockets being an integer multiple of the number of pockets in the other set so that all of the said plunger members can simultaneously make a driving connection from the driving element to the driven element, and each of the said plunger members having its radially extending dimension exceeding the thickness of the cage by an amount greater than the depth of the pockets in the driven element but no greater than the depth of the pockets in the driving element, said driven element exerting a frictional drag on said floating cage to insure that the driving element will exert radial forces on said plungers members urging the latter toward said driven element whenever the driving and driven elements are turning at different speeds so that the driven element can completely overrun the driving element and yet be driven from the driven element by the plunger members when no such overrun exists.

References Cited in the file of this patent

UNITED STATES PATENTS

| | | |
|---|---|---|
| 1,213,303 | Valentine | Jan. 23, 1917 |
| 1,262,562 | Reiche | Apr. 9, 1918 |
| 1,270,897 | Taylor | July 2, 1918 |
| 1,336,950 | Ford | Apr. 13, 1920 |
| 1,689,285 | Knab | Oct. 30, 1928 |
| 1,836,684 | Robbins | Dec. 15, 1931 |

FOREIGN PATENTS

| | | |
|---|---|---|
| 143,573 | Great Britain | Feb. 24, 1921 |
| 474,560 | Great Britain | Nov. 3, 1937 |
| 40,256 | France | June 8, 1932 |
| | (Addition to No. 618,110) | |